May 10, 1932.   C. J. HOLSLAG   1,857,306
ARC WELDING SYSTEM
Filed Aug. 18, 1930
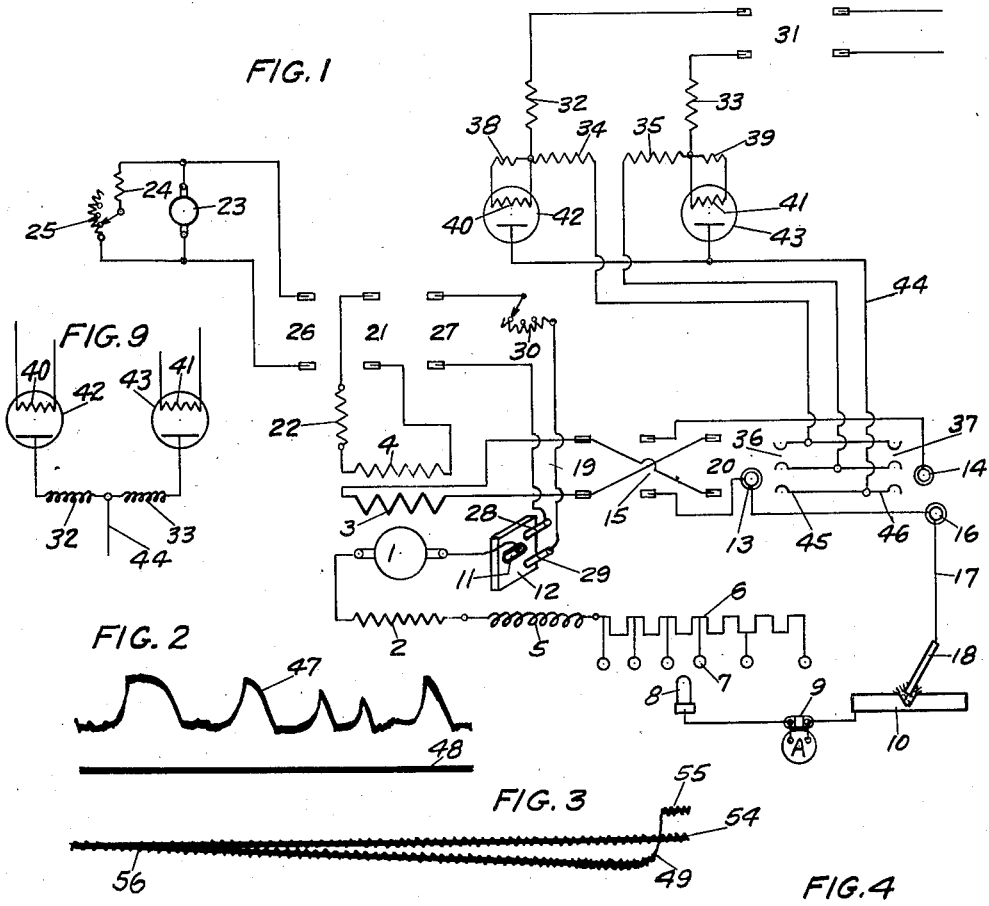
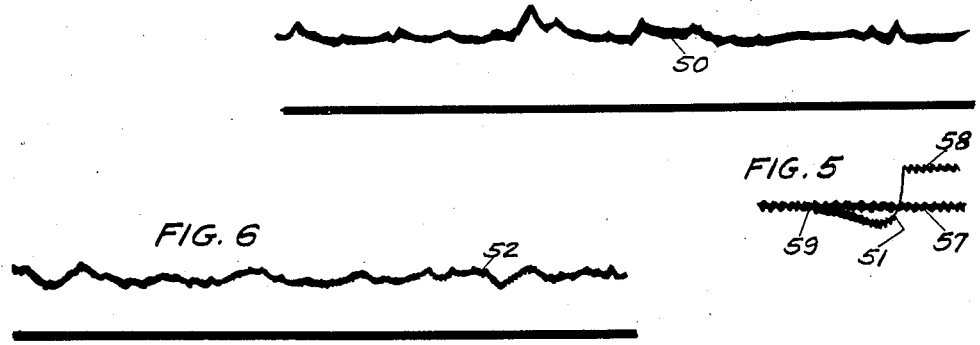
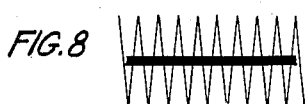
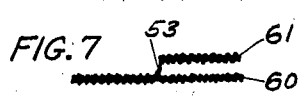
Inventor
CLAUDE J. HOLSLAG
Attorney
A. D. T. Libby Patented May 10, 1932

1,857,306

UNITED STATES PATENT OFFICE

CLAUDE J. HOLSLAG, OF SOUTH ORANGE, NEW JERSEY, ASSIGNOR TO ELECTRIC ARC CUTTING & WELDING COMPANY, OF NEWARK, NEW JERSEY

ARC WELDING SYSTEM

Application filed August 18, 1930. Serial No. 476,102.

This invention relates to improvements in an arc welding system in which a direct current generator is the source of energy for the arc welding circuit.

In my Patent 1,719,112, I have shown and described an arc welding system in which the generator delivers both direct and alternating current for the purposes therein specified. The generator of said patent is provided with pole pieces on which shunt and series windings are located and additional interpoles also carrying a series winding.

My present improvement is applicable to a generator having field windings so arranged, but it is not necessarily limited to such a machine. For example, the interpoles may be omitted entirely and, as will be later pointed out, the series field winding, for certain purposes, may not be utilized; yet the advantages of my invention may still be used where only the shunt, or as I choose to term it in this specification, the main field winding alone is utilized.

So far as I am aware, it has been the practice in the past to excite the shunt or main field winding either from the generator itself or in the majority of cases from a separate exciter, this exciter usually being a small shunt wound generator driven from the welding generator shaft or the shaft of the motor driving the said welding generator and designed to produce a voltage for direct application to the field of the welding generator.

Where the main field of the generator is energized or excited by its own armature, the voltage applied to the main field winding is that of the armature minus a small drop in potential through the field-regulating rheostat, there being no drop in this device when the rheostat is all cut out. In the case of separate excitation, the exciter is usually wound to deliver voltage substantially the same as the open circuit voltage of the arc welding generator which usually runs from 50 to 70 volts. The voltage at the arc welding electrodes varies from 13 to 40 volts, according to conditions of use, and the balance of the generator voltage is absorbed in the differential action of the generator and the controlling reactance and/or regulating resistance, including of course the external circuit, whereby a certain stability is rendered the arc. However, even with an interpole field winding and a series cumulative or differential winding associated with the shunt or main field winding, such generators are relatively slow in their recovery following the separation of the welding electrodes as the operator strikes an arc.

When the operator touches the movable electrode to the work, this puts a short circuit on the generator through the circuit including the reactance and/or regulating resistance and the voltage is reduced and consequently the current is rapidly changed, and unless the generator has the ability to recover rapidly, vital time is lost, even though this is only a fraction of a second, and the welding characteristics of the generator are unsatisfactory.

These sudden and rapid changes at the arc produce a reaction of the series winding on the main or shunt field winding, if a series winding is then in use. This is in the nature of a transformer action, whereby when the arc is changing, an induced current is set up in the main field winding which may be in opposition to that delivered by the exciter, with the result that many times the main field is killed entirely and in certain cases the polarity of the exciter generator is reversed. Certain welding characteristics are exemplified in the drawing attached hereto and will be further described in a later part of this specification. Suffice it to say here, that it is the principal object of my invention to provide a welding system in which the transformer action as above set forth is nullified or overcome and a quick recovery of the generator to its normal welding condition is obtained.

Another object of my invention is to provide a special exciter circuit for the main field of the generator so arranged that the electrodes are dead until an arc welding circuit has been established at the switchboard controlling the operation of the generator.

Other objects will appear after reading of the specification taken in connection with the annexed drawing, wherein:

Figure 1 is a diagrammatic view of my improved welding system.

Figure 2 is a draftman's copy of an oscillograph record showing the current variations through the arc of an ordinary arc welding generator.

Figure 3 is a draftman's copy of an oscillograph record showing the time recovery of the generator supplying the current of Figure 2.

Figure 4 is a draftman's copy of an oscillograph record showing a curve corresponding to Figure 2, but of a much more improved form of generator than that delivering the characteristics of Figure 2.

Figure 5 is a draftman's copy of an oscillograph record showing the recovery of a generator delivering the curve of Figure 4.

Figure 6 is a draftsman's copy of an oscillograph record showing the current variations in the arc circuit of my improved welding system.

Figure 7 is a draftsman's copy of an oscillograph record showing the time recovery of a generator delivering the current shown in Figure 6.

Figure 8 is a draftsman's copy of an oscillograph record showing a 60-cycle time wave used for measuring the time in the recovery curves of Figures 3, 5, and 7.

Figure 9 is a diagrammatic view showing how the reactances in the A. C. power line of Figure 1 may be differently arranged.

Referring now to the details, 1 illustrates the armature of a direct current generator having a series interpole winding 2, a series winding 3, and a main field winding 4. As shown, the interpole winding 2 is connected to a reactance 5 and this in turn to a resistance 6. The resistance 6 is provided with a plurality of taps 7 to receive a plug 8, whereby the generator circuit on this side may be extended to the ammeter A or its shunt 9, to the work 10. It is to be noted here that the reactance 5 and the resistance 6 may be wound on the same core, thereby obtaining reduction of cost in material and providing an automatically tapped impedance wherein the changing in the resistance taps automatically changes the reactance by varying the turns. The opposite pole of the generator 1 is connected to a terminal 11 of a plug 12.

The terminal 11 is adapted to engage either a socket 13 or a socket 14, both of which are connected to the blades 15 of a double-pole, double-throw switch. The socket 13 is also connected to a socket 16 which is adapted to be extended by a suitable plug and conductor 17 to the movable electrode 18.

In the position 19 of the switch 15, the series field winding 3 is connected in certain relation with the main field 4, as will be pointed out later; and in reverse direction when the switch 15 is in the position 20. The main field winding 4 is connected to the blades of the switch 21 through an impedance 22, preferably in the form of a resistance. A small exciter 23 has a shunt winding 24 and a control rheostat 25. This exciter is connected to the position 26 of the switch 21 and may be driven from the generator shaft or from the prime mover driving the generator, or any other means; or the current may be taken from a D. C. power line.

The voltage of the exciter 23 is made to be materially higher than the voltage required to excite the main field winding 4 for a normal full-load operation of the generator 1, and as a matter of practice, I prefer to make this exciter voltage substantially twice that of the open circuit voltage of the generator 1; for example, 110 to approximately 130 volts, if the field has been wound for 55 to 65 volts. The impedance 22, which is preferably fixed, is then of such value as to reduce the potential across the winding 4 to that which will produce normal excitation therein.

The switch points 27 are connected to plug members 28 and 29 carried by the switch plug 12, and the usual field control rheostat 30 may be included in these leads. A second source of energizing current is applied through the switch 31 which on one side is connected to a source of alternating current, usually a 220 volt power circuit. The other side of the switch 31 is connected to a transformer preferably of the auto type, having windings 32 and 33 acting as reactances, and windings 34 and 35 which are open-circuited at the switch contacts 36 and/or 37. Exciting windings 38 and 39 are provided to excite the cathodes 40 and 41 of the rectifiers 42 and 43, the anodes of which are connected by the wire 44 with switch contacts 45 and 46.

The reactances 32 and 33 are necessary in order to prevent an excess flow of current from the power line through the rectifier tubes 42 and 43, produced by the higher potential required for the excitation circuit of the generator. While I have shown the reactances 32 and 33 in a certain position, they may be placed as shown in Figure 9.

The switch contacts 36 and 45 are mechanically associated with the socket 13, and the switch contacts 37 and 46, with the socket 14, so that when the switch 12 is manipulated, the plug 11 engages in one instance the socket 13, while the plug 28 engages the two switch contacts 36, and the plug 29 the switch contact 45. When the switch 12 is in this position, it will be seen that the armature circuit of the generator 1 is extended directly to the socket 16 and through the conductor 17 to the electrode 18, thereby eliminating the series field winding 3 entirely, which is desired for certain welding conditions; for example, certain forms of carbon arc welding.

With the switch 12 manipulated so that the plug 11 engages the socket 14, and the plug 28 the switch contacts 37, and the plug 29 the contact 46, it will be seen that the armature circuit of the generator 1 is then carried to the blade of the switch 15, and the series winding 3 may then be connected in cumulative or differential compound, to get the results set forth in my patent referred to on page 1, by throwing the switch to either one of the positions 19 or 20.

In either position of the switch 12, the rectifier circuit is closed and extended to the switch contacts 27 so that when the switch 21 is thrown to the position 27, the rectifier current from the rectifiers 42 and 43 is applied to the main field winding through the impedance 22.

I have thus provided two sources of excitation for the main field of the generator, and in the case of the alternating source of supply, the electrodes 10 and 18 are dead until the arc welding circuit has been set up at the switch board and extended to these electrodes, which is highly advantageous where it some times happens that the separate exciter 23 and the switch 21 are not used. The latter method of excitation does not depend on the speed of the welding generator nor on changes in the load due to the variations at the arc, and neither can it be reversed under any conditions of operation of the generator, or varied by any action of the prime mover or generator. Furthermore, neither method of excitation is dependent on the welding generator for picking up the voltage for excitation purposes; and the field load, although relatively small as compared to the armature load, is removed from the generator per se.

The voltage of the rectifier current is substantially the same as the exciter 23; i. e., materially higher than the normal open circuit voltage of the generator. By making the voltage of the source of excitation of this higher value, which is greater than the reverse effect of the transformer action between the series and main field windings as previously referred to, the manipulation of the welding electrodes can never produce changes which will kill the exciter circuit, or reverse the exciter; and under such conditions, the higher voltage reacts very much faster than any other arrangement of which I am aware, and I have been able to reduce the time recovery to an almost negligible amount as will be seen by reference to the curves of Figures 2 to 8.

In Figure 2 there is shown a current curve taken by an oscillograph, illustrating the variations through the arc. The maximum current shown by one of the peaks, for example 47, is approximately 200 amperes, the line 48 being the zero line.

The time recovery of the generator which supplied the current curve of Figure 2, is illustrated in Figure 3. In making the recovery curves shown in Figures 3, 5, and 7, the following method was used:

A resistance was substituted in place of the arc, such that the voltage drop through the resistance was 25 volts, and the current flowing through this steady resistance is illustrated by the line 54. A short circuit was then thrown across the resistance and the current rose to the value indicated by the line 55. On removing the short circuit around the resistance, the current passes by the steady current line 54 to the point 49, and the time from the break in the line 55 down to the point 49 and to the point 56 indicates the time recovery. In this particular case, the time was .5 of a second.

The time recovery in this case, as well as the other curves, was measured by applying to the same oscillograph record taking the curves, a standard 60-cycle wave, which is illustrated in Figure 8. This wave form was taken from the public service power circuit of the city of Newark, N. J., which power circuit is kept accurately in step with the Arlington time signal system, so that 60-cycle timing is guaranteed on the power lines of the Public Service Corporation.

In Figure 4, is illustrated a current curve 50 of a generator similar to that shown in my patent hereinbefore referred to, the current in this case being approximately 300 amperes.

In Figure 5, the line 57 corresponds to the line 54 in Figure 3, while the line 58 corresponds to 55, and 51 corresponds to the point 49 of Figure 3, and the point 59 is the approximate point where the current comes back to normal value on the line 57. In this case the recovery curve of the generator was approximately .1 of a second.

In Figure 6, the arc current curve 52 is from my improved form of generator, and the recovery curve is shown in Figure 7, wherein the line 60 is the steady current through the resistance, while the line 61 is the current increase by reason of the short circuit, while the line 53 shows that the machine immediately falls to normal value on the removal of short-circuit and does not overrun the line 60. The recovery in this case is .008 of a second. This curve shows that the short circuit current is lower than in the other generators and the time recovery is almost instantaneous, with the general result that an inexperienced welder can operate such a machine with good results, while an expert welder can attain vastly better results than heretofore obtained.

From these curves, which are copies of oscillograph records taken from the generator of my improved welding system, it will be seen that the action of the higher potential, which acts as a guardian voltage, in the exciter circuit controlled by the impedance 22, is such as to produce a very quick recovery in the arc circuit when striking the arc, and the regulation under welding conditions is thus wonderfully improved over previous welding systems.

Irrespective of whether or not the series differential field is used, my improvement applies to a welding system having only a shunt or main field winding for the reason that the armature reaction, changes in speed, the variations in the load, coupled with a consequent falling of the exciter voltage, when the exciter is driven from the generator shaft or the prime mover driving the generator, all tend to make unstable conditions at the arc, and hence the slow recovery of the generator. My improved arrangement overcomes these difficulties even if the field is excited from any separate power source.

Stated in another way, where the exciter voltage is the same as the normal voltage required to fully excite the main field of the generator under normal conditions of operation, and the transformer action heretofore referred to is such as to reduce the flux of the main field to zero or actually reverses it, there is no potential then existing at the welding generator main field terminals to cause the field to build up again when the arc is attempted to be struck by the operator, and hence trouble is encountered. By having an exciter voltage materially higher than the normal voltage for which the main field of the generator is wound, this voltage at once reacts to nullify the transformer action described between the main and series fields, and prevents the welding generator main field current from ever being reduced to a point whereby the excitation produced by it will not bring the magnetization curve of the main field core down to a point where recovery will not be practically instantaneous, and it is this instantaneous effect that I secure by using a higher exciter voltage than it has been the custom to use.

I have furthermore, found that by using short circuit turns on the field poles adjacent the series winding, or imbedded in the poles; or by shorting part of the series winding, the impedances 32 and 33 may be increased, while the impedance of the windings 34 and 35 may be decreased, which allows me to reduce the amount of excess voltage necessary to obtain the desired result. By increasing the impedances 32 and 33, the harmful results of a short circuit through the rectifier tubes is minimized. Decreasing the ratio between the series turns and the main field turns, has the same effect; that is, of reducing the transformer action heretofore referred to, but there are limits in these directions.

It will be apparent that the details for carrying my invention into practice may be varied over that illustrated, which however, is a practical working form which I have used, and I therefore do not wish to be unduly limited in the interpretation of the appended claims.

Having thus described my invention, what I claim is:

1. For an arc welding system, a generator having its armature adapted to be connected into the arc welding circuit, a main field winding and at least one series field winding for exciting the armature, means for energizing the main field winding, and means for preventing the reaction of the series field winding on the main field winding from reversing the source of energization of the main field, said means comprising an impedance in the main field circuit and having a value such that a part of the energizing voltage is absorbed in the impedance.

2. For an arc welding system, a generator having; its armature adapted to be connected into an arc welding circuit, at least one series field winding in the arc circuit, a main field winding, a source of energization for said main winding separate from the generator, said source having a potential materially higher than the voltage for which said main winding is wound to give normal excitation for the generator armature, and an impedance in the main field winding circuit such as to cut down the voltage of said energizing source so said main winding will normally give full-load excitation.

3. For an arc welding system, a generator having; its armature adapted to be connected into an arc welding circuit, a main field winding arranged on field poles of the generator, a series winding in the arc circuit arranged on the field poles with said main winding, a source of energization for said main winding separate from the generator, said source having a potential materially higher than the voltage required to give normal full-load excitation to the main field, and an external impedance in the main field circuit for the purposes described.

4. For an arc welding system, a generator having; main and series field windings, a separate source of excitation for the main field winding, said source having a potential higher than necessary to excite the main field to its normally designed value, and a separate impedance in the exciter and main field winding circuit for the purposes described.

5. In an arc welding system including a D. C. generator having, main and series field windings; means for securing quick recovery of the current strength in the arc circuit on striking an arc, said means including a separate source of excitation for said main field winding, said source having a potential materially higher than the voltage necessary to fully excite said winding, and a separate impedance in the exciter circuit for the purposes described.

6. In an arc welding system including a

D. C. generator having main and series field windings with means for connecting the series winding in differential relation to the main winding, said winding being distributed on the same field poles; means for preventing the transformer action between said windings during any of the welding operations from killing or reversing the main field, said means including a source of separate excitation for the main field winding, said source having a potential materially in excess of that required to normally excite said main winding, and a separate impedance in the exciter circuit as and for the purposes described.

7. In an arc welding system including a D. C. generator having main and series field windings with means for connecting the series winding in differential relation to the main winding, said winding being distributed on the same field poles; means for preventing the transformer action between said windings during any of the welding operations from killing or reversing the main field and for insuring a very rapid recovery of the arc current on striking an arc, said means including a separate source of current for exciting the main field winding, said source of current having a potential higher than any potential that can be set up in reverse direction in the main field winding by the transformer action of said series winding by any manipulation of the arc electrodes, and a separate impedance in the main field circuit for the purposes described.

8. In an arc welding system included a generator having at least a main field winding; means for securing quick recovery of the current in the arc circuit on striking the arc, said means including a separate source of excitation for said main field winding, said source having a potential materially higher than the voltage necessary to fully excite said winding, and a separate impedance in the exciter circuit for the purposes described.

9. In an arc welding system included a generator having at least a main field winding; means for securing quick recovery of the current in the arc circuit on striking the arc, said means including a separate source of excitation for said main field winding, said source of potential being a rectified alternating current materially higher than the voltage necessary to fully excite said winding, said source of current being open-circuited until a welding circuit is established to the arc electrodes, and an impedance in the exciter circuit as and for the purposes described.

10. In an arc welding system included a generator having at least a main field winding; means for securing quick recovery of the current in the arc circuit on striking the arc, said means including a separate source of excitation for said main field winding, said source of potential being a rectified alternating current materially higher than the voltage necessary to fully excite said winding, said main field winding being unexcited until the generator armature circuit is extended to the welding electrodes, and a separate impedance in the exciter circuit for the purposes described.

11. In an arc welding system included a generator having at least a main field winding; means for securing quick recovery of the current in the arc circuit on striking the arc, said means including a separate source of excitation for said main field winding, said source of potential being a rectified alternating current materially higher than the voltage necessary to fully excite said winding, switch contacts normally holding said rectified current circuit open and thereby maintaining the welding electrodes dead, means for setting up and extending the generator armature circuit to the welding electrodes and for closing said switch contacts to close the exciting circuit through the main field winding, and a separate impedance in said main field circuit for the purposes described.

12. An arc welding system including a generator having at least a main field winding, a source of alternating current, means for rectifying said alternating current, means for passing said rectified current to said main generator field winding, said passing means normally holding the rectifying circuit open, means for setting up and extending the generator armature circuit to the welding electrodes and for completing the rectified exciter circuit through said main field winding, and a separate impedance in the exciter circuit for the purposes described.

13. An arc welding system including a generator having at least a main field winding, a plurality of separate sources of current for exciting said field winding, and means for selecting either source at will, one of said sources being D. C. while the other is A. C., means for rectifying the A. C. for use in the exciter circuit, both the D. C. and rectified A. C. exciter sources having a voltage materially higher than that required to give normal excitation to said main field winding, and a separate impedance in the main field winding circuit for the purposes described.

14. An arc welding system including a generator having at least a main field winding, a plurality of separate sources of current for exciting said field winding, and means for selecting either source at will, one of said sources being D. C. while the other is A. C., means for rectifying the A. C. for use in the exciter circuit, means for holding the rectifier circuit open until an arc circuit has been established from the generator to the arc electrodes, both the D. C. and rectified A. C. exciter sources having a voltage materially higher than that required to give normal excitation to said main field winding, and a separate impedance in the main field winding circuit for the purposes described.

15. In an arc welding system included a generator having at least a main field winding; means for securing quick recovery of the current in the arc circuit on striking the arc, said means including a separate source of excitation for said main field winding, said source of potential being a rectified alternating current materially higher than the voltage necessary to fully excite said winding, means to prevent a short circuit of the power supply through the rectifier due to said higher voltage, and an impedance in the exciter circuit of the main field of the generator for the purposes described.

16. In an arc welding system included a generator having at least a main field winding; means for securing quick recovery of the current in the arc circuit on striking the arc, said means including a separate source of excitation for said main field winding, said source of potential being a rectified alternating current materially higher than the voltage necessary to fully excite said winding, an impedance in the rectifier circuit to prevent the power supply from being shorted through the rectifier, and a separate impedance in the main field circuit of the generator for controlling the application of said higher voltage to said field.

17. In an arc welding system included a generator having at least a main field winding; means for securing quick recovery of the current in the arc circuit on striking the arc, said means including a separate source of excitation for said main field winding, said source of potential being a rectified alternating current materially higher than the voltage necessary to fully excite said winding, means in the rectifier circuit to increase the impedance thereof so as to force at least the greater part of the current coming through the rectifier through the main field winding of the generator, and an impedance in the main field circuit of the generator for controlling the application of said higher voltage to said field.

18. In an arc welding system included a generator having at least a main field winding; means for securing quick recovery of the current in the arc circuit on striking the arc, said means including a separate source of excitation for said main field winding, source of potential being a rectified alternating current materially higher than the voltage necessary to fully excite said winding, means to prevent a short circuit of the power supply through the rectifier due to said higher voltage, means for holding the power supply circuit through the rectifier open until an arc circuit is extended to the arc electrodes, and separate means in the exciter circuit of the main field of the generator to reduce the voltage of the current going to said main field to correspond with the voltage for which said field is designed.

19. In an arc welding system included a generator having at least a main field winding; means for securing quick recovery of the current in the arc circuit on striking the arc, said means including a separate source of excitation for said main field winding, said source having a potential materially higher than the voltage necessary to fully excite said winding, and means in the exciter circuit of said main field to reduce the voltage of the current going to said main field to correspond with the voltage for which said field is designed.

20. In an arc welding system included a generator having at least a main field winding; means for securing quick recovery of the current in the arc circuit on striking the arc, said means including a separate source of excitation for said main field winding, said source of potential being a rectified alternating current materially higher than the voltage necessary to fully excite said winding, an impedance in the rectifier circuit to prevent the power supply from being shorted through the rectifier, a separate impedance in the main field circuit of the generator, and means on the poles of the generator to assist said separate impedance in controlling the application of said higher voltage to said field.

21. In an arc welding system included a generator having at least a main field winding; means for securing quick recovery of the current in the arc circuit on striking the arc, said means including a separate source of excitation for said main field winding, said source of potential being a rectified alternating current materially higher than the voltage necessary to fully excite said winding, a transformer for supplying the current to be rectified, said transformer including impedances in the input and output side of the rectifier, said impedance being arranged to minimize harmful results to the rectifier, a separate impedance in the exciter circuit of said main field winding, and means on the generator field poles to assist said separate impedance in controlling the application of said higher voltage to said field.

22. For an arc welding system, a generator having at least a main field winding, a separate source of excitation for said main winding, said source having a potential materially higher than necessary to excite said main field to its normally designed value, and means for automatically holding said main field current and the magnetization curve within a range such that the recovery is very rapid on making or breaking the arc.

In testimony whereof, I affix my signature.

CLAUDE J. HOLSLAG.